Figure 1:
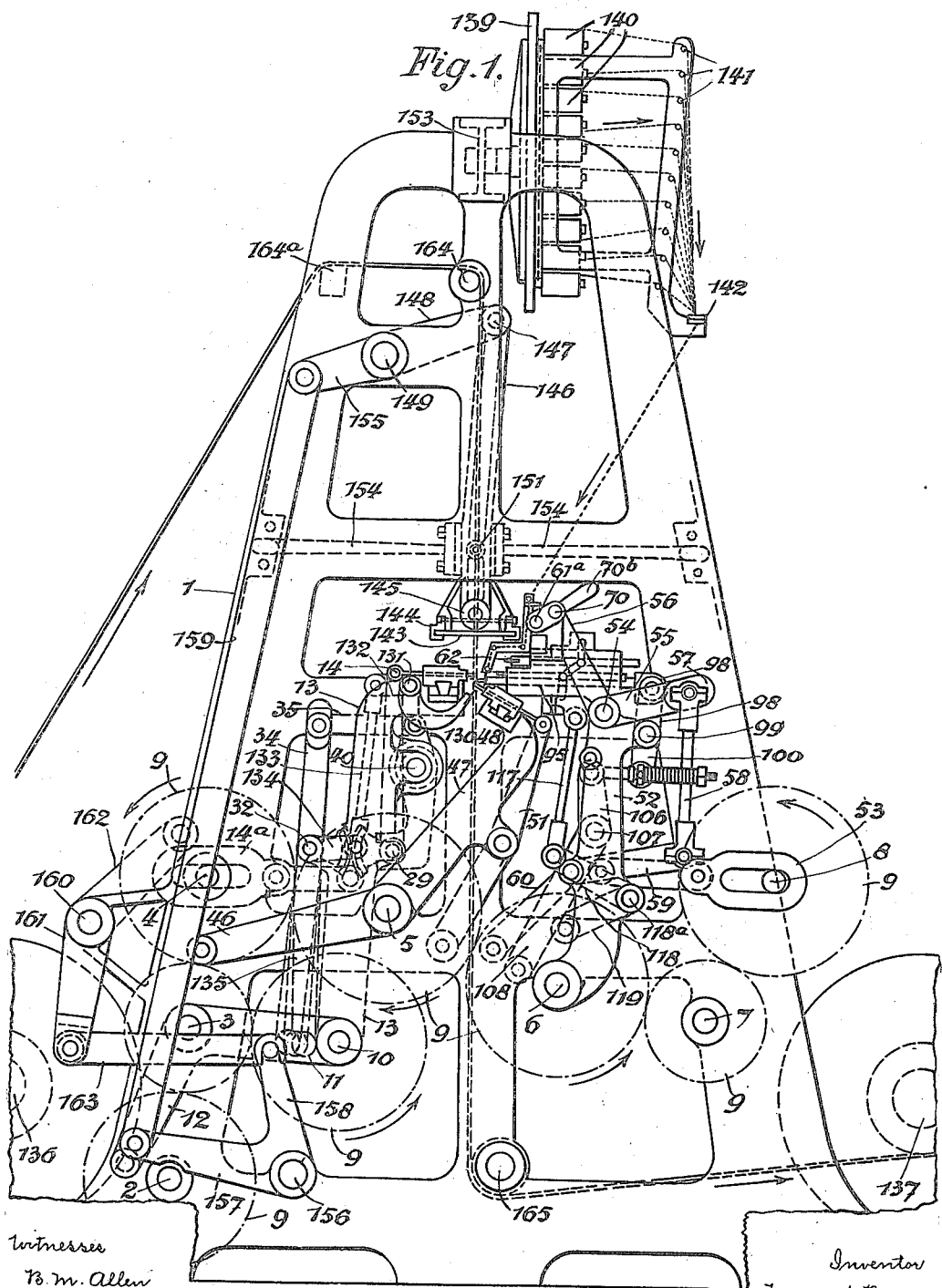

F. BOYER.
MACHINE FOR MANUFACTURING KNOTTED CARPETS.
APPLICATION FILED SEPT. 30, 1914.

1,193,229.

Patented Aug. 1, 1916.
11 SHEETS—SHEET 1.

Witnesses
B. M. Allen
J. B. Le Blanc

Inventor
Fernand Boyer
By Serrell Son
his Attorneys

F. BOYER.
MACHINE FOR MANUFACTURING KNOTTED CARPETS.
APPLICATION FILED SEPT. 30, 1914.
1,193,229.
Patented Aug. 1, 1916.
11 SHEETS—SHEET 2.
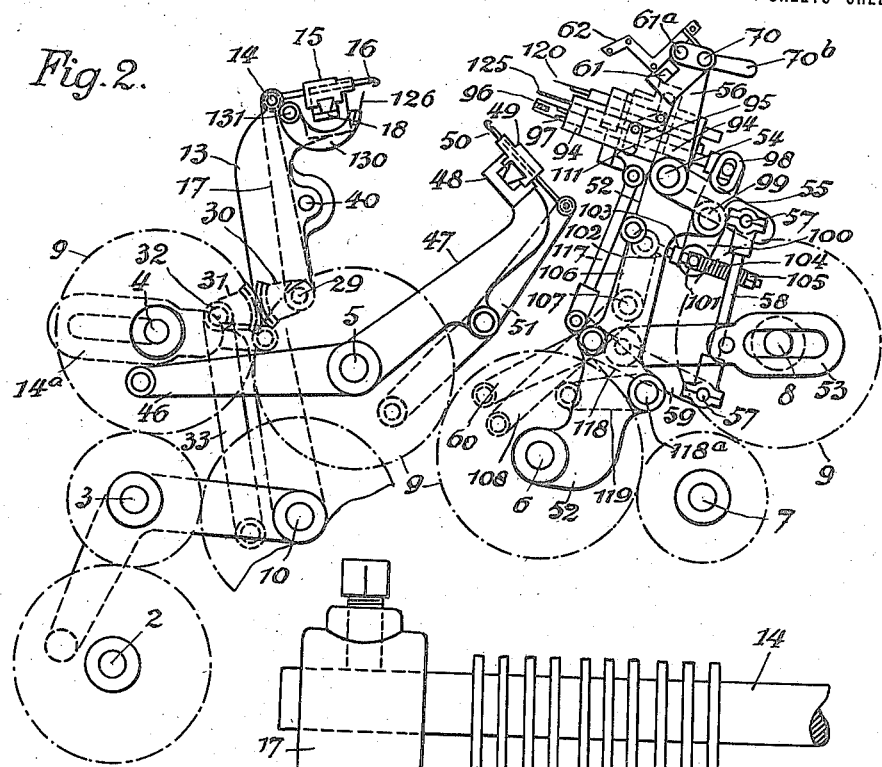
Fig. 2.
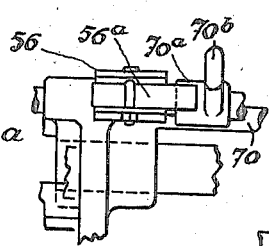
Fig. 1ᵃ
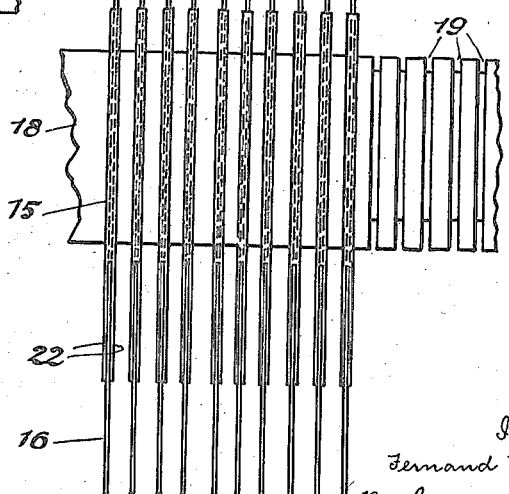
Fig. 18.
Witnesses.
B. M. Allen.
J. B. Le Blanc.
Inventor
Fernand Boyer
By Serrell Son
his Attorneys.

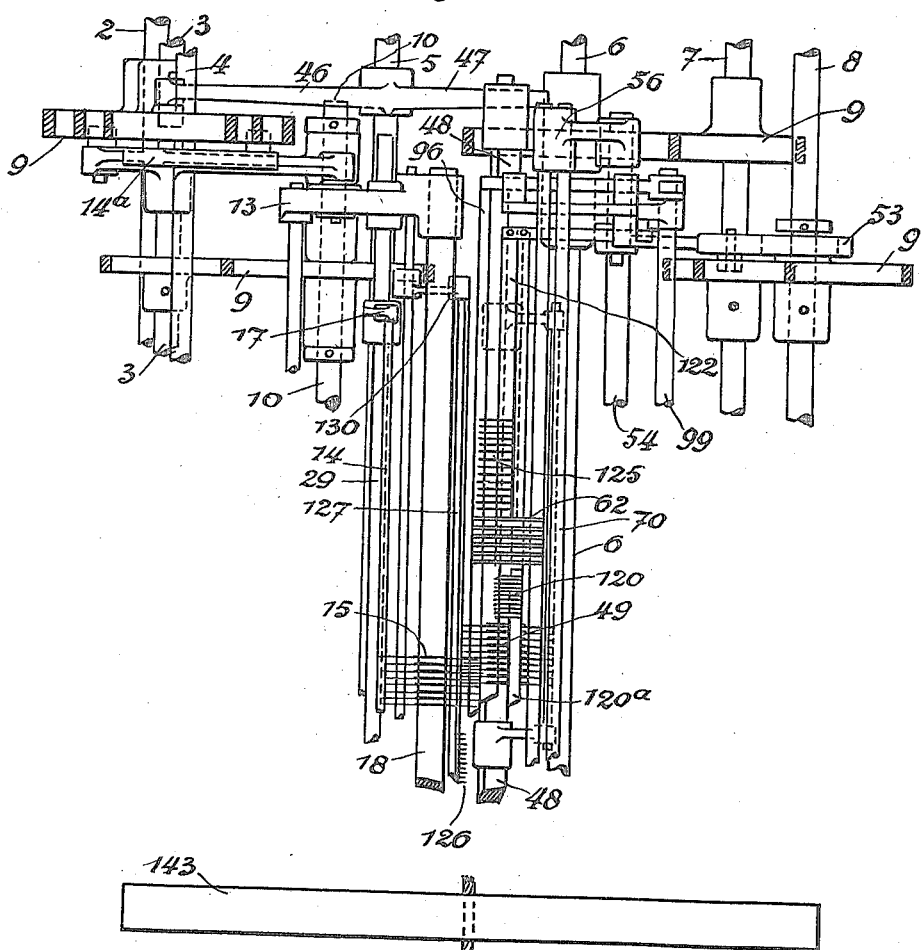
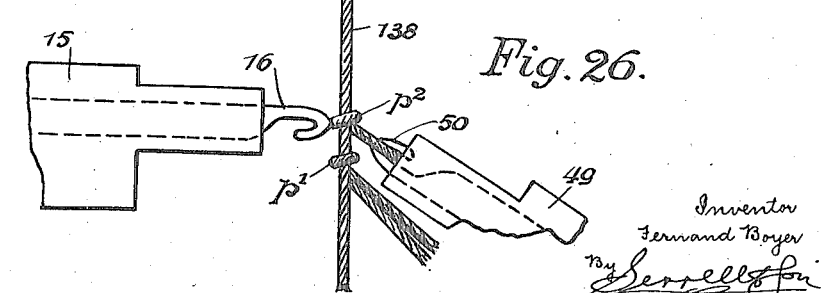

F. BOYER.
MACHINE FOR MANUFACTURING KNOTTED CARPETS.
APPLICATION FILED SEPT. 30, 1914.
1,193,229.
Patented Aug. 1, 1916.
11 SHEETS—SHEET 4.
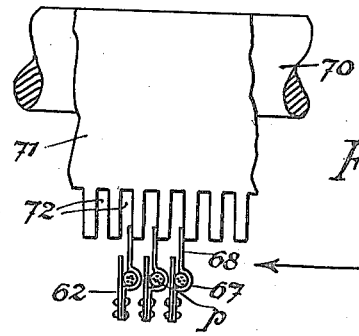
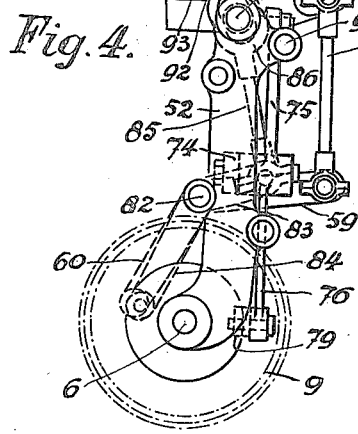
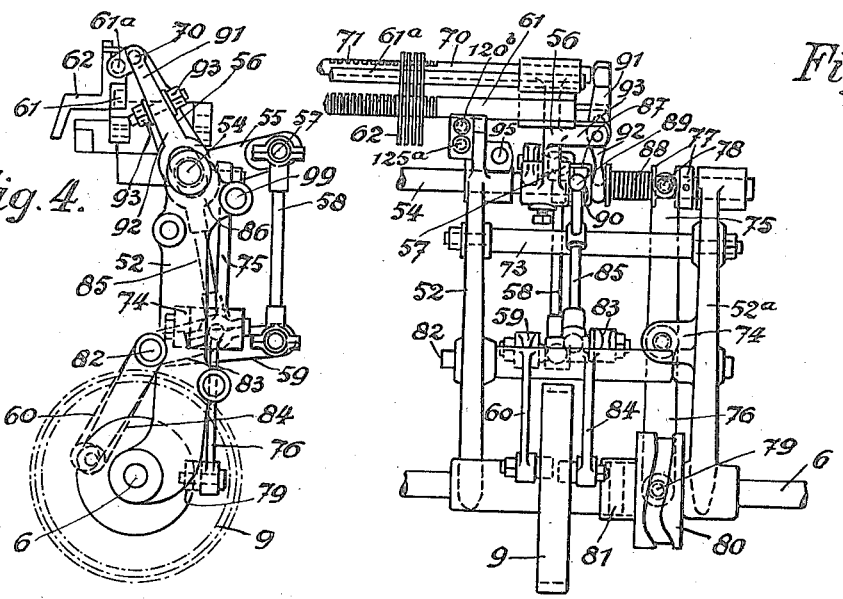
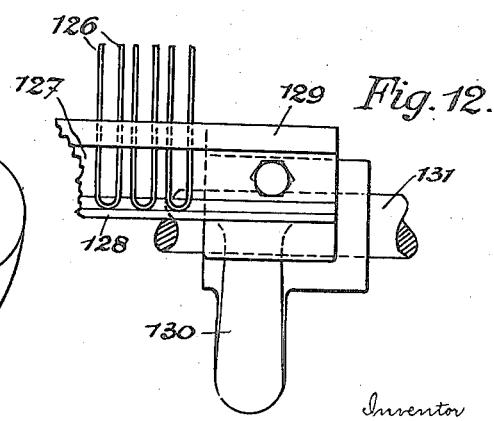
Witnesses
B. M. Allen.
J. B. Le Blanc.
Inventor
Fernand Boyer
By Serrell & Son
his Attorneys.

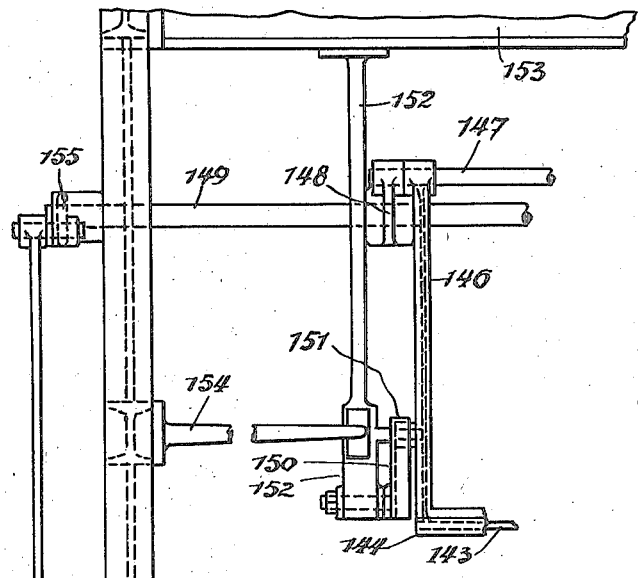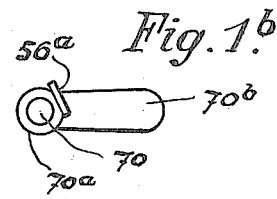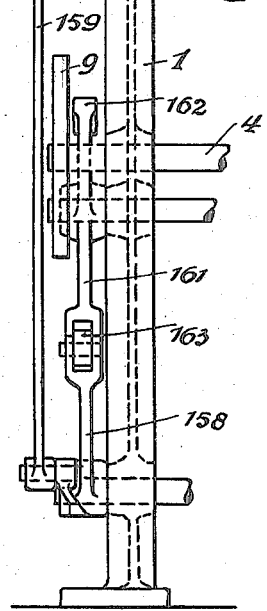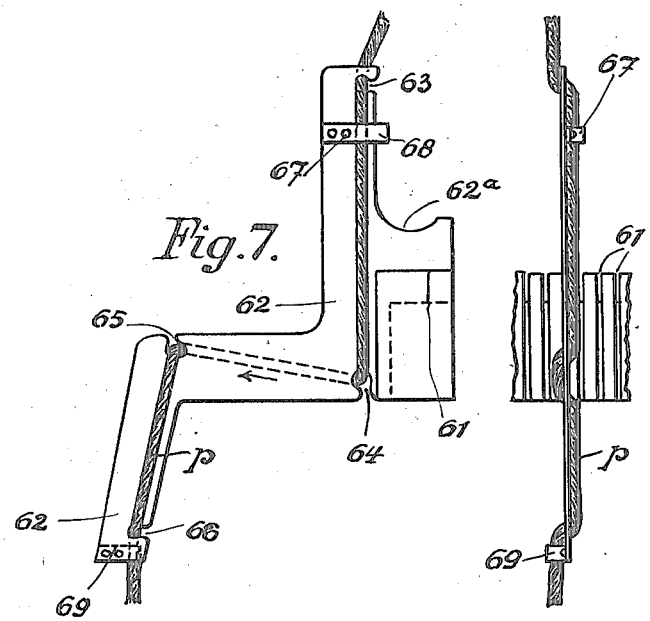

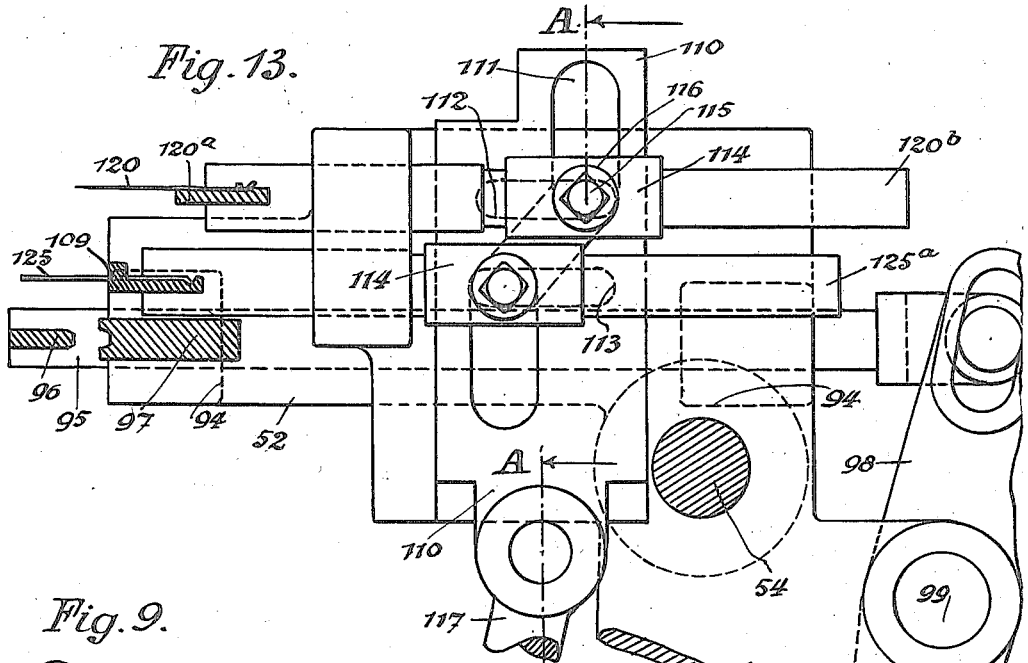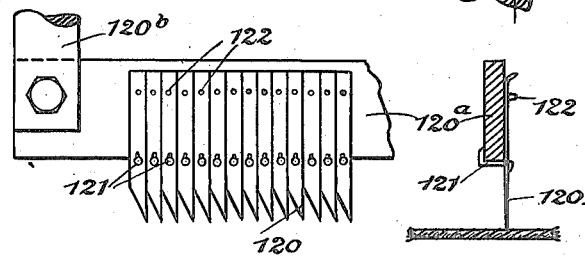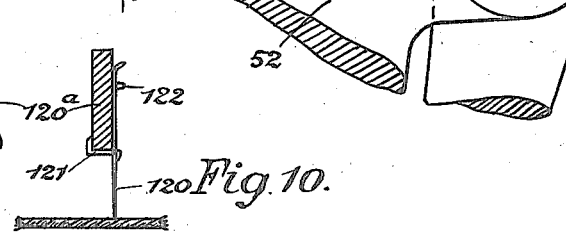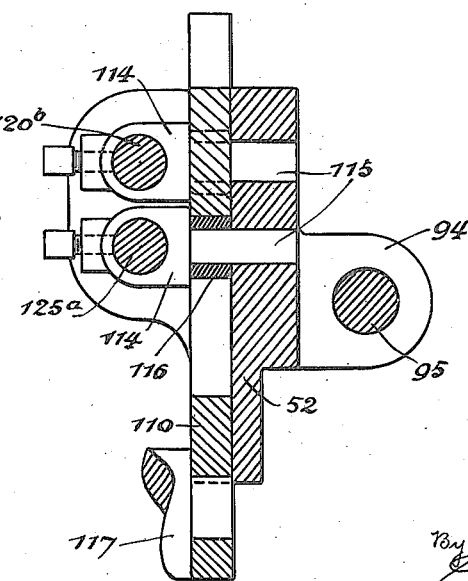

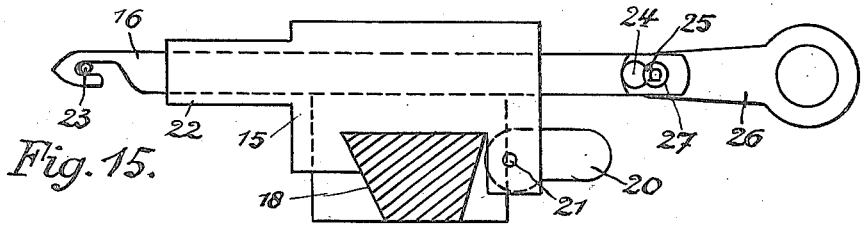
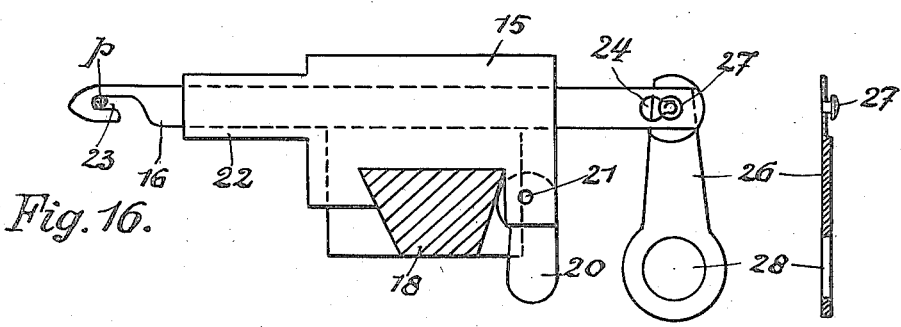
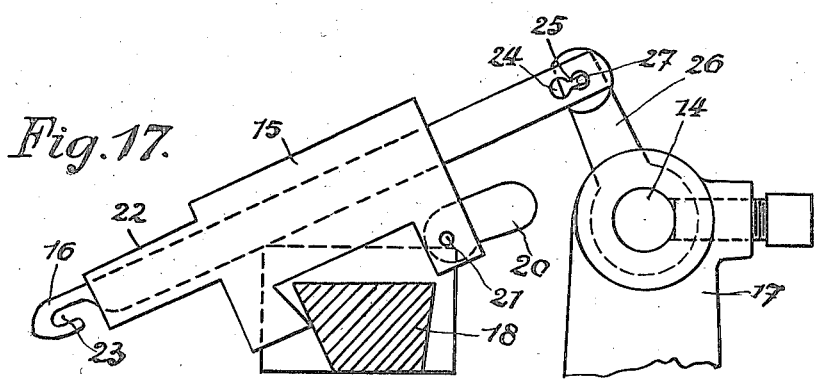
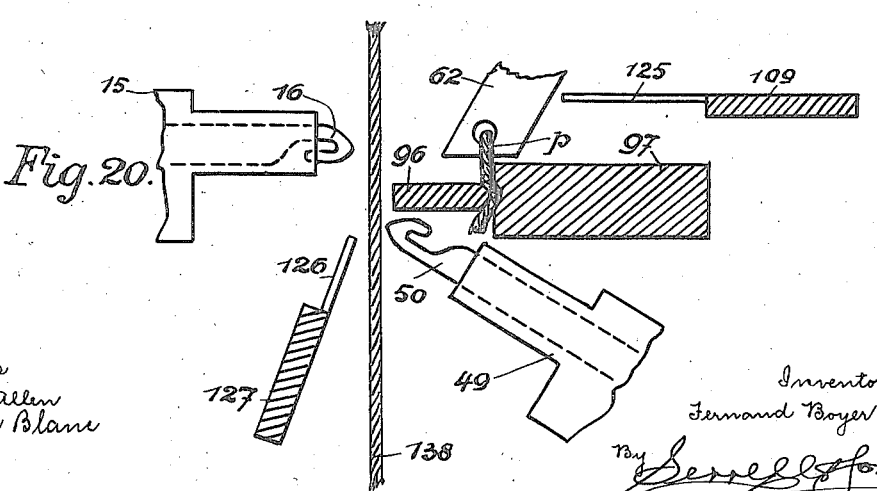

F. BOYER.
MACHINE FOR MANUFACTURING KNOTTED CARPETS.
APPLICATION FILED SEPT. 30, 1914.

1,193,229.

Patented Aug. 1, 1916.
11 SHEETS—SHEET 8.

Witnesses
B. M. Allen
J. B. Le Blanc

Inventor
Fernand Boyer
By Serrell Son
his Attorneys.

F. BOYER.
MACHINE FOR MANUFACTURING KNOTTED CARPETS.
APPLICATION FILED SEPT. 30, 1914.
1,193,229.
Patented Aug. 1, 1916.
11 SHEETS—SHEET 9.
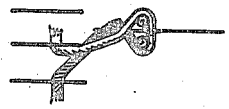
Fig. 25ᵃ
Fig. 26ᵇ
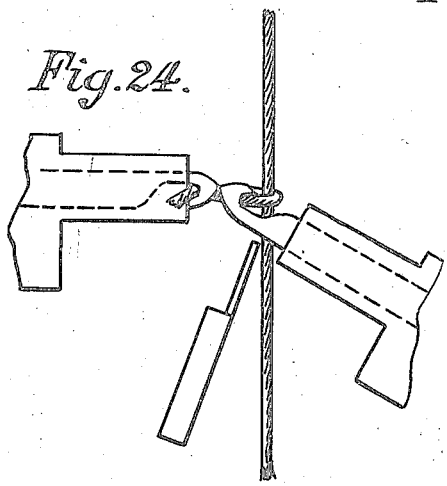
Fig. 24.
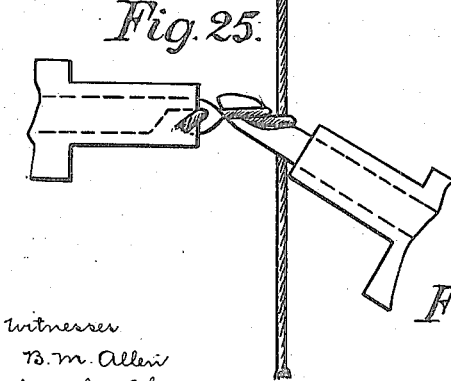
Fig. 25.
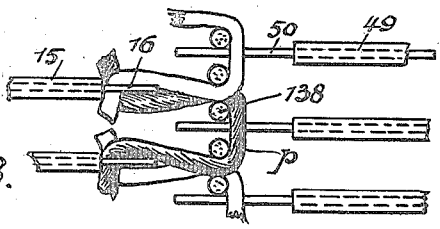
Fig. 28.
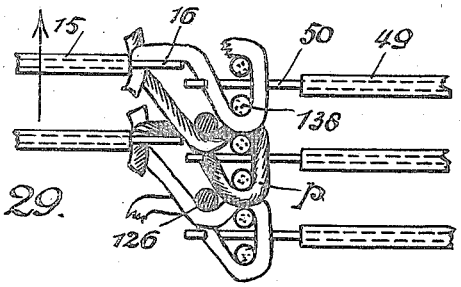
Fig. 29.
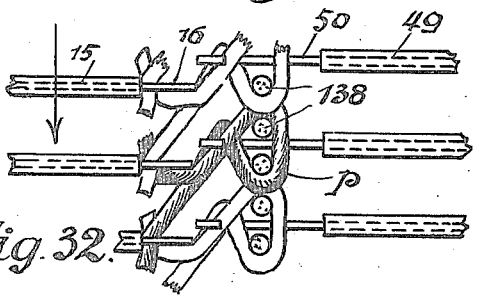
Fig. 32.
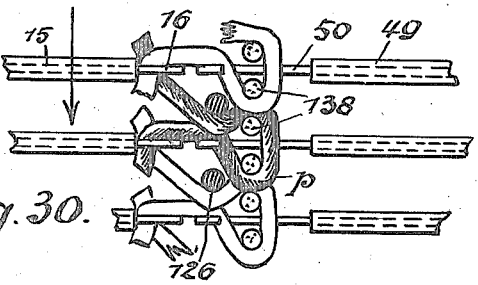
Fig. 30.
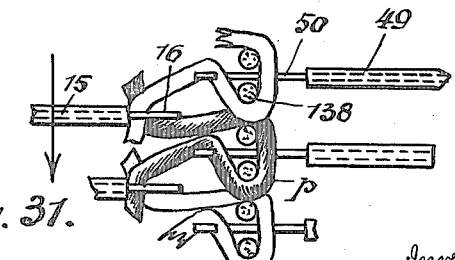
Fig. 31.
Inventor
Fernand Boyer

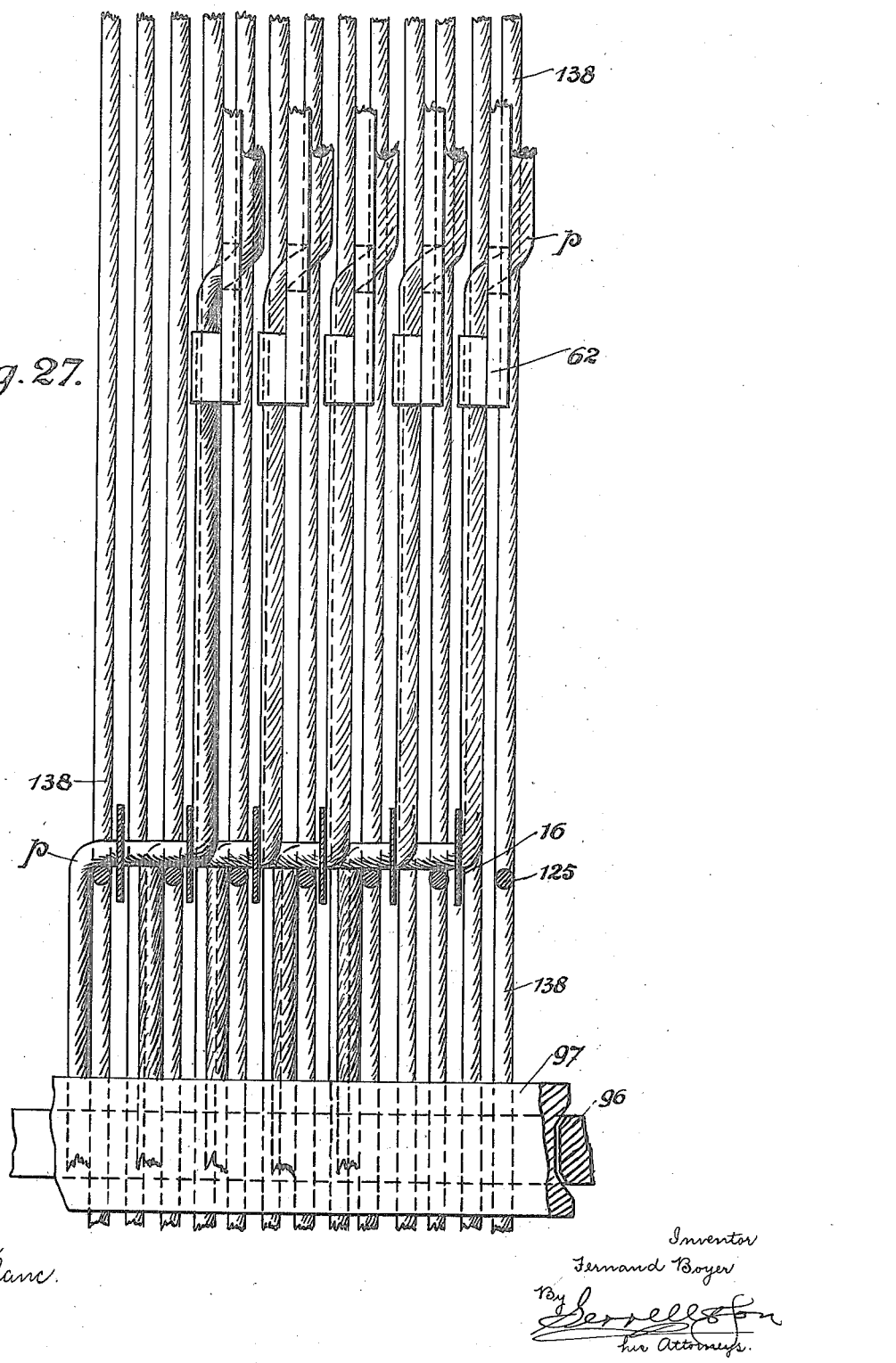

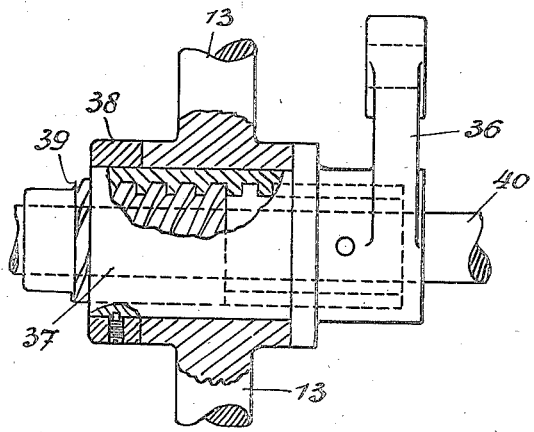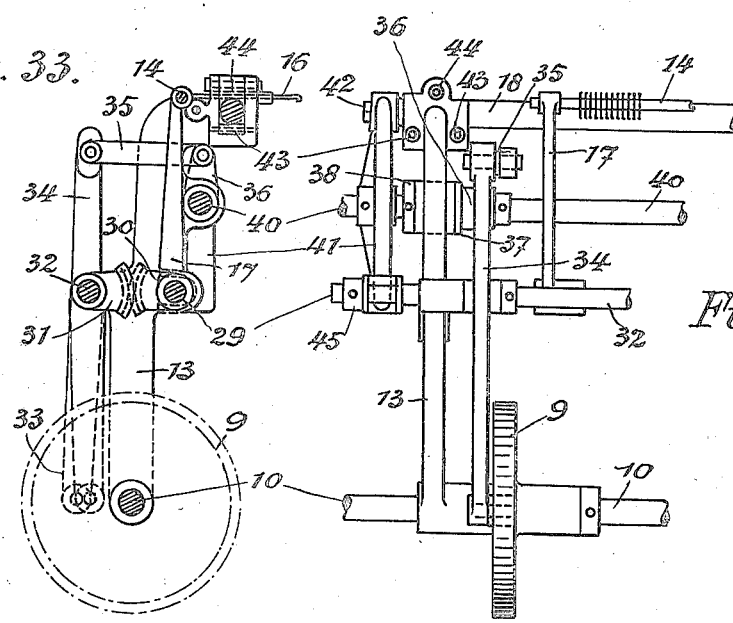

UNITED STATES PATENT OFFICE.

FERNAND BOYER, OF PARIS, FRANCE.

MACHINE FOR MANUFACTURING KNOTTED CARPETS.

1,193,229.      Specification of Letters Patent.      Patented Aug. 1, 1916.

Application filed September 30, 1914. Serial No. 864,221.

*To all whom it may concern:*

Be it known that I, FERNAND BOYER, manufacturer, a citizen of France, residing at Paris, in the Republic of France, have invented certain new and useful Improvements in Machines for Manufacturing Knotted Carpets, of which the following is a specification.

This invention relates to an improvement in machines for manufacturing knotted carpets.

Oriental knotted carpets, or so called Persian and Smyrna carpets, have hitherto been made with imperfect tools and are in fact nothing but handmade articles.

As is known knotted carpets are made with pile threads, passed around and tightened upon some of the warp threads of a tissue. According to the kind of knots employed these carpets are called either Persian or Smyrna carpets. These two knots do not differ much from each other, but the Smyrna knot is the more solid one. These pile-threads when knotted into a tissue of either kind will project with their ends on one side of the tissue forming a velvet-like covering. So far as I am aware, all efforts hitherto made in producing such carpets by machinery have been unsuccessful. Such machinery, moreover, is very expensive, complicated, and so slowly working that it cannot compete with skillful hand labor.

In certain machines, the pile-threads are first prepared separately, being cut to size in a hand-operated apparatus, and are then fed to the machine for knotting. This process limits the output and requires much attendance. In another machine which automatically prepares the pile-threads the tools are so clumsy as to be used to advantage only in coarse work, and if employed in fine work, it is necessary to go over each series of pile-knots several times, shifting the machinery each time, thereby reducing the output to such an extent as to make it impossible, with such a machine, to compete with hand labor.

According to the present invention, the pile-thread is gripped by an open tool and its ends drawn through the warp, whereupon the ends are crossed and drawn back again through the warp and then tightened.

In the machinery made according to my invention, very simple tools, closely set together, are employed and the pile-threads, without previous preparation, are taken directly from bobbins or balls.

In the accompanying drawings one form of such a machine is shown.

Figure 1 represents a side elevation of the machine. Fig. 2 is a view of certain parts of the same in a different position from Fig. 1. Fig. 3 is a part plan, Figs. 4 and 5 are a side and a front elevation of a device for operating the thread-guides. Fig. 6 shows, on an enlarged scale, a device for clamping the threads on the thread-guides. Figs. 7 and 8 are side and front elevations of such a guide. Figs. 9 and 10 are a plan and a cross-section of a device for cutting the pile-threads. Figs. 11 and 12 show in side and front elevation holding-pins and the supports of the same. Fig. 13 is a side elevation on an enlarged scale of the head of a main arm, carrying some of the knotting tools. Fig. 14 is a vertical section of Fig. 13. Figs. 15 to 17 are detail side views, showing in different positions the hooks, and Fig. 18 represents several of these hooks in plan. Fig. 19 is a part front elevation of the device for operating the reed of the machine. Figs. 20 to 26 are side elevations of the knotting tools in different positions. Figs. 25$^a$ and 26$^a$ are plans showing the manner of making and tightening a knot. Fig. 27 is a view of the pile thread just before being introduced into the warp. Figs. 28 to 32 show, in plan, the relative positions of the pile thread during the knotting operations. Figs. 33 and 34 represent, in side and front elevation, a mechanism for operating the knotting tools. Fig. 35 is a part of said mechanism on an enlarged scale, and Fig. 36 shows in plan some of the thread rests used in the knotting operations with part of their supporting bar.

In Fig. 1, 1 is a frame in which there are bearings for shafts 2, 3, 4, 5, 6, 7 and 8. There are two parts to the frame in each machine, and the shafts extend between the same. On each of the shafts 2, 4, 5, 6, and 8 a spur wheel 9 is mounted with eccentrics or grooves for cam rollers on their sides. The wheels 9 on shafts 3 and 7 are intermediate gears. All these wheels are geared together, so as to form one train and certain of the same are merely journaled on the shafts, while others are keyed fast thereto. By driving one or more shafts the whole train moves, the direction of motion being indicated by arrows (Fig. 1). There is also a rocker shaft 10 with a wheel 9 (Fig. 1 and Fig. 2) which is journaled in the part 11 of a two-armed lever 11—12, pivoted on the shaft 3. The wheel 9 of the shaft 10 gears with an intermediate wheel on the shaft 3 so as not to interfere with the other wheels even when swinging with the shaft 10. The arm 12 of the lever 11—12 engages, by means of a friction roller, the cam groove of the wheel 9—2 (9—2 indicating the wheel 9 on the shaft 2). On the shaft 10 is also journaled an arm 13 (Figs. 1 and 2) which is guided by means of a link 14$^a$ (Fig. 1) and a roller in the groove of wheel 9—4. The lever 11—12, the arm 13 and the link 14$^a$ together with the necessary cam wheels are employed in pairs and separated at the required distance. When the wheels are turned, the lever 11—12, guided by the groove in the wheel 9—2, will swing the arm 13 together with shaft 10 radially and vertically, the arm 13 being swung at the same time horizontally by means of the link 14$^a$ guided by the groove in the wheel 9—4. This arrangement is employed in order to give the required positions to the knotting tools carried by the arm 13.

Within guide pieces 15, the arm 13 supports hooks 16 (Fig. 2) and the hooks 16 are caused to slide within said guides by means of arms 17. The guide pieces 15 are fixed on a straight bar 18 which together with the hooks 16 and the arms 17 may also be moved in a longitudinal direction. The hooks 16 are therefore movable forwardly, backwardly, laterally, upwardly and downwardly, and at the same time are slidable within the guides 15.

The arrangement of the hooks 16 and of the associated parts may be seen in Figs. 15 to 18. The straight bar 18 is provided with notches 19 (Fig. 18) receiving the guide pieces 15, said notches being cut on three sides of the bar so that at the notched portions the cross section of the bar is that shown in Figs. 15 to 17.

20 is an eccentric-lever fulcrumed at 21 between two ears on a guide-piece 15. By means of this lever 20, the guide-piece 15 may be clamped fast to the straight-bar as soon as the guide-pieces are in proper position within the notches 19.

Figure 22:
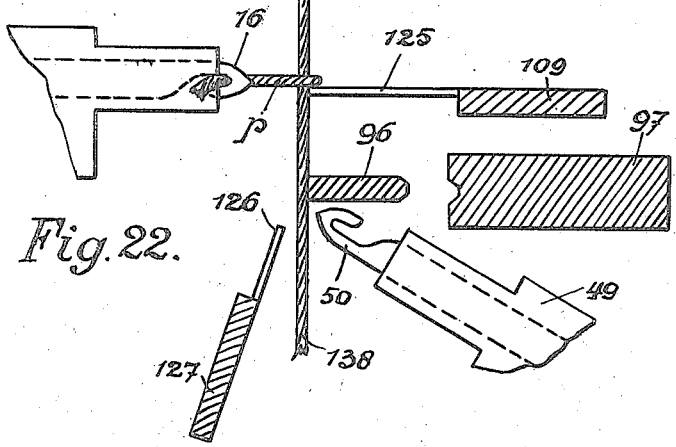

Two projections 22 on the forward end of each guide-piece (Fig. 18) exert a yielding pressure on its hooks 16 and in the inner position of the hook a pile thread $p$, as shown in Fig. 16, is pressed against said projections 22 (Fig. 22). Depending on the pull exerted on the hook 16, the pile thread $p$ may be either clamped tightly or clamped so as to be left to slide between the hook and projections 22. In each hook, there is a hole 24 and a slot 25. The hole and slot are to receive a headed pin 27 on a link 26 in order to connect this link with a hook, the rear end of which moves on the reduced end of the link 26 carrying the pin 27. In order to separate a hook 16 from the link 26, it is moved into the position shown in Fig. 17, at right angles with the link and is drawn slightly to the left, so that the head of the pin 27 may be pulled through the hole 24. In the same position, the hook 16 may be connected again with the link. This connection is sufficient for the continuous operation of the hook and makes it possible to easily change a hook when necessary. When the hook 16 is in alinement with the link 26 or in any of the operative positions of these parts in which they may assume an angle to one another, the end of the hook 16 bears against a shoulder on the link 26 so that the parts cannot become disconnected. When, however, it is necessary to remove and replace a hook 16 the guide bars 15 may be lifted to such a position that the end of the hook 16 will clear the shoulder on the link 26 so that the hook 16 may be so moved so as to shift the pin 27 in the hole 24 so that by separating the parts laterally the head of the pin may pass through this hole to entirely separate the hook from the link. Obviously the operation of inserting a hook is the reverse of that just described for removing one.

The links 26 are each provided with a hole 28 to receive the shaft 14, which is supported by the arms 17. The latter are mounted on a shaft 29 which is journaled in the arms 13 and free to slide in a longitudinal direction. A toothed segment 30 is mounted on the same shaft (Fig. 2) and gears with a segment 31 fast on a shaft 32 which is journaled in the arms 13. The shaft 32 also carries an arm 33 which is guided at its free end by means of a friction roller engaged in the groove of one of the cams 9 on the shaft 10. Whenever the arm 33 is moved radially by this cam the movement is transmitted by means of the segment 30, 31, to the shaft 29, and the hooks 16 will be reciprocated thereby within the guide pieces 15. On the shaft 32 there is also keyed a lever 34 engaged at one end by means of a roller in a groove of one of the cams 9 on the shaft 10 and connected at the other end by means of a link 35 to an arm 36 (Fig. 33) working a nut 37. The latter is journaled in a bearing in the arm 13 and held in place by a collar 38. The nut 37 engages a worm 39 keyed to a shaft 40. On one end of this shaft is fixed a cross-piece 41 and the other end is journaled in a bearing in the second arm 13. The cross-piece is secured by a screw 42 with its upper end against the straight bar 18, which is adapted to slide between the rollers 43 and 44 arranged within the heads of the arms 13. The lower end of the cross-piece 41 is forked and engages the projecting collars of a bushing 45 fast on the shaft 29. As the lever 34 is oscillated by the roller in the cam groove of the gear 9—10, the nut 37 will be turned and the shaft 40 will be reciprocated. This reciprocating movement will be transmitted by the cross piece 41 to the straight bar 18 as well as to the shaft 29 and therefore the arms 17 and the hooks 16 will be moved backward or forward during this movement. The segment 31 remains in place during the reciprocating movement of the shaft 29 and the segment 30, the segment 30 being made sufficiently broad to engage with the segment 31 at all times.

On the shaft 5 (Fig. 1) is journaled a two-armed lever 46—47, the rear arm 46 of which engages with its roller the groove in the cam wheel 9—4, said wheel having cam-grooves in both sides. The other arm 47 of this lever has fixed at its top end the straight bar 48 (Figs. 1 and 2) with guide-pieces 49 and hooks 50, similar to the parts 15 and 16, with the difference however that the hooks 50 are inverted, that is the mouths of the hooks lie upward instead of downward. There is a lever 46—47 on both ends of the machine, and the straight bar 48, with its associated parts, are supported by these two levers. By an arm 51 (see Fig. 2), the hooks 50 are moved in the guide-pieces 49 in a manner similar to that in which the hooks 16 are moved. The top end of the arm 47, together with the straight bar 48, guide-pieces 49, and the hooks 50 are oscillated by a roller in the cam groove on the wheel 9—4 by means of the arm 46, and the hooks are moved in their guide-pieces by means of the lever 51 and a roller in the cam groove in the wheel 9—5. On the shaft 6 is journaled an arm 52 (Figs. 1 and 2), which is connected by means of a slotted link 53 to the shaft 8 and to a roller in a cam-groove in the wheel 9—8, for imparting a rocking radial movement to the arm 52. There is one of these arms 52 on each side of the machine, and journaled in their upper ends is a shaft 54 (Figs. 1 and 2). The shaft 54 is fitted at each end of the machine with an angular lever 55—56, the arm 55 being connected by means of a universally jointed rod 57, 58, to one arm 59 of an angular lever 59—60. The arm 60 (Fig. 1) of this lever is actuated by means of a roller running in a cam groove in the wheel 9—6. The lever 55—56 is oscillated therefore by this cam wheel.

The arms 55 and 56 support a straight bar 61, whereon are mounted at suitable intervals thread-guides 62, held in place within notches in the straight bar 61 by means of a shaft 61$^a$ fitting into recessed parts 62$^a$ of the thread guides (Fig. 7). Each of these thread-guides is provided with slots 63, 64, 65, and 66 (Figs. 7 and 8), through which the pile thread $p$ runs in the direction indicated by the arrow in Fig. 7. At the top of the thread-guide a metal spring 67 is arranged in such a way that it leaves the pile thread free to run between it and the plate of the thread-guide, but by pressing on a projecting part 68 of it the pile thread may be clamped and stopped as will be explained further on. At the lower part of the thread-guide a metal spring 69 of similar form as the spring 67 is provided, but without any projection for moving the same. The spring 69 fixes the place where the pile thread leaves the guide, in order to present the stump of thread left after its being cut in a proper way to a clamp, which then grips it, as will be explained hereinafter.

In the top ends of the arms 56 a shaft 70 (Figs. 1 and 2) is fitted to slide, and this shaft carries a straight plate 71 (Fig. 6). By a flat spring 56$^a$ (Fig. 1$^a$) the shaft 70 is prevented from turning. This spring is held fast by the arm 56 and bears with its free end against a flattened part of a bushing 70$^a$ secured on the shaft 70. The bushing 70$^a$ is provided with a handle 70$^b$, whereby the shaft 70 may be turned, whenever the straight plate 71 has to be removed from the thread guides during the threading of the same. Then the spring 56$^a$ is brought to bear against a second flat part of the piece 70$^a$ whereby the straight plate 71 is fixed in its inoperative position. This straight plate 71 is provided with recesses 72 and is with its shaft 70 arranged in such a way that the projecting parts 68 of the springs 67 are each engaged in one of the recesses 72. By a sidewise reciprocating movement of the straight plate 71 with the shaft 70 in the direction of the arrow in Fig. 6, each pile thread $p$, engaged by the corresponding spring 67 will be clamped and released again when the shaft 70 is returned to its operative position. By the means for moving the arms 52, hereinbefore described, the thread-guides may be made to move with these arms, and by operating the lever 55—56 on the shaft 54, the thread-guides may be swung backwardly and forwardly. Also the shaft 54, together with the levers 55—56 and all the thread-guides may be made to reciprocate sidewise, the means for accomplishing this latter movement and for operating the shaft 70 may be seen in Figs. 4 and 5.

The shaft 54 is journaled and free to rock within the arms 52 and on one side of the machine this shaft is journaled also in an arm 52$^a$ in the same manner as in the arms 52. The arm 52$^a$ is connected to the arm 52 by means of a rod 73 (Fig. 5), and moves with it. In a lug 74 thereon a lever 75—76 is pivoted, and at the top end of the arm 75 there is a roller 78 lying between two projecting bushings 77 secured on the shaft 54. At the end of the other arm 76 a roller 79 is guided in a groove in a cylinder 80 keyed on the shaft 6 and connected to the toothed wheel 9—6 by means of a coupling 81 so as to turn with the same. Depending on the curve of the groove in the cylinder 80, the arm 76 is swung to right or left, and this movement is transmitted by the arm 75 to the shaft 54 and all parts mounted thereon. These movements are possible even when the shaft 54 is simultaneously oscillated on its axis by means of the angular lever 59—60. This lever is journaled on an arbor 82, supported by the arms 52 and 52$^a$, and on this same arbor another angular lever 83—84 is journaled, the arm 84 of which carries a roller engaging the second cam groove in the wheel 9—6, while the other arm 83 is connected by a universal joint to a rod 85 provided with a fork 86 at its upper end. Between the straight tines of this fork is the flattened part of a bushing 87 adapted to move freely on the shaft 54, and subjected to the action of a spring 88. The ends of the tines are provided with cylindrical bosses 89, which, owing to the pressure of the spring 88, bear on one side against one face of the angular lever 55—56, which is fast on the shaft 54, and on the other side against the beveled rim of the bushing 87, in such a manner that whenever the cam disk 9—6 causes the lever 83—84 to oscillate the bosses 89 slide along the bevel surfaces 90 of the bushing 87 and move the said bushing on the shaft 54 in one direction or the other. The bushing 87 is also provided with a groove within which the forked end of a lever 91—92 is engaged, said lever being pivoted on two lugs 93 cast on the arm 56. The free end of the arm 91 of the lever 91—92 is shaped like a knob and bears against the end of the shaft 70 so as to push it, together with the straight plate 71, in the direction of the arrow shown in Fig. 6, as soon as the arm 84, as seen in Fig. 4, has been swung to the left and the fork 86 has shifted the bushing 87 to the right, as seen in Fig. 5. By this operation the pile-threads will be clamped fast. The opposite movement of the arm 84 will move the bushing 87 in the opposite direction and the shaft 70, with the blade 71, will be free to be pushed back again in its initial position by a spring not shown in the drawing. The gripping of the pile threads may thus be effected in all the positions of the thread-guides.

The heads of the arms 52, as one is shown in Fig. 13 on an enlarged scale, are provided on their outer sides with lugs 94, wherein rods 95 (Figs. 1 and 2) are free to slide. On one of their ends these rods 95 support a straight bar 96, shown in cross-section in the Figs. 20 to 22, which works together with another straight bar 97 held fast between the heads of the arms 52 and with it forms a clamp for gripping the pile threads. The other end of each rod 95 engages with the slotted part of an arm 98 fast on a shaft 99, and the said shaft also carries a forked arm 100, fitted with a sleeve 101 between the tines of the fork. This sleeve is crossed by a tie-rod 102 having on one side of the sleeve a shoulder 103 and the other side of the sleeve a helical spring 104 with a set nut 105. The rod 102 is connected with the forked end of an arm 106 fast on a shaft 107 which is journaled in a bearing on the arm 52. Another arm 108 fast to this same shaft is provided with a roller running in the cam groove of the wheel 9—6. On each side of the machine there is one of the wheels 9—6, one for the arm 60 and the other for the arm 108, as shown in Fig. 3. When the wheel 9—6 is turned, the arm 108 will be swung to one side and the arm 106 operates the rod 102, the shoulder of which pushes against the sleeve of the arm 100, thereby moving the arms 98 and the rods 95 in order to open the clamp 96—97. The opposite movement of the arm 108 causes the clamp to close and this may be regulated by the spring 104 and the set nut 105. On the heads of the arms 52 there are also guides for the sliding rods 120$^b$, 125$^a$ (Fig. 13). In a suitably slotted part thereof, the rod 120$^b$ carries a knife-bar 120$^a$ and the rod 125$^a$ a thread-rest bar 109. Between the rods 120$^b$ and 125$^a$ and the head of the arm 52, there is a vertically moving slide plate 110 having a bayonet-shaped slot 111 and provided with pieces 114 screwed fast to the rods to keep said slide laterally in place. These pieces 114 extend by means of the studs 115 thereon into horizontal slots 112 and 113 provided in the head of the arm 52 and are fitted with friction-rollers 116 journaled on said studs and corresponding exactly to the width of the slot 111. When the slide 110 is moved up and down the rollers 116 will slide in the slots and the rods 120$^b$ and 125$^a$ together with the bars 120$^a$ and 109 fixed thereon will be moved to and fro.

At the beginning of the knotting operation, the slide 110 assumes its lowest position, so that the roller 116 of the rod 120$^b$ is at the upper end of the slot 111, while the roller 116 of the rod 125$^a$ is vertically below the same. The rods 120$^a$ and 109 will then be in their retracted position. The slide 110 being connected by means of a link 117 with the arms 118 fast on a shaft 118$^a$ will be moved up and down by the action of an arm 119 fast on the same shaft and operated by a roller cam groove of the wheel 9—6. The slides 110 are thus moved from the initial position into the position as shown in Fig. 13 whereby the thread-rest bar is moved toward the warp. By continuing the movement of the slide upward, the knife bar will be moved toward the warp, and upon the slide moving down, both bars will be drawn back again.

A row of knives 120 (Figs. 9 and 10) are fitted to the knife-bar 120ª, each knife being secured thereto by an angularly bent and riveted holder 121 which clamps it to the bar 120ª, and each knife is also provided with a hole in its back-part to receive a pin 122 set in the bar. The thread-rest bar 109 (Fig. 36) is provided along its back edge with a groove 123 and along its front edge with a flange 124 having holes for the thread-rests 125. These are made of resilient wire, each being U-shaped to form two rests and at its curved part adapted to snap into the groove 123 when the parts thereof have been introduced into the holes in the flange 124.

There are also holding-pins 126 employed (Figs. 2, 4, 11 and 12) for forming the knots. These are similar to the thread-rests and are made of bent wires passing through holes in a flange 129 of a bar 127 and snapped into a groove 128. The bar 127 is fastened to the two curved arms 130 which, on each side of the machine, are keyed fast on a shaft 131 (Figs. 1 and 2) journaled in the heads of the arms 13. Secured on the same shaft are arms 132 connected by links 133 to the arms 134 of the angular levers 134—135, which are on a shaft 32 journaled in the arms 13. Each arm 135 is actuated by means of a roller running in the cam groove of the wheel 9—10. By moving the arm 135, the arms 130 are moved and the thread-rests will be swung up and down.

In Fig. 1 may also be seen the warp-beam 136 and the beam 137 for the completed article. These beams are moved in the direction of the arrows by any suitable means not shown in the drawing. The warp is run through the machine over a guide board 164ª and guide rollers 164 and 165, as indicated by arrows, and is presented vertically to the working tools of the machine.

On a cross-beam connecting the two frames 1 a spool rack 139 (Fig. 1) is attached for the pile thread $p$. For each thread-guide 62 a bobbin 140 is employed and is arranged on the rack in such a way that there is no possibility of entangling the threads. From these bobbins the thread $p$ is made to run over the bars 141 and through a distributing plate 142 to the thread-guides 62, as indicated by arrows.

Figure 21:
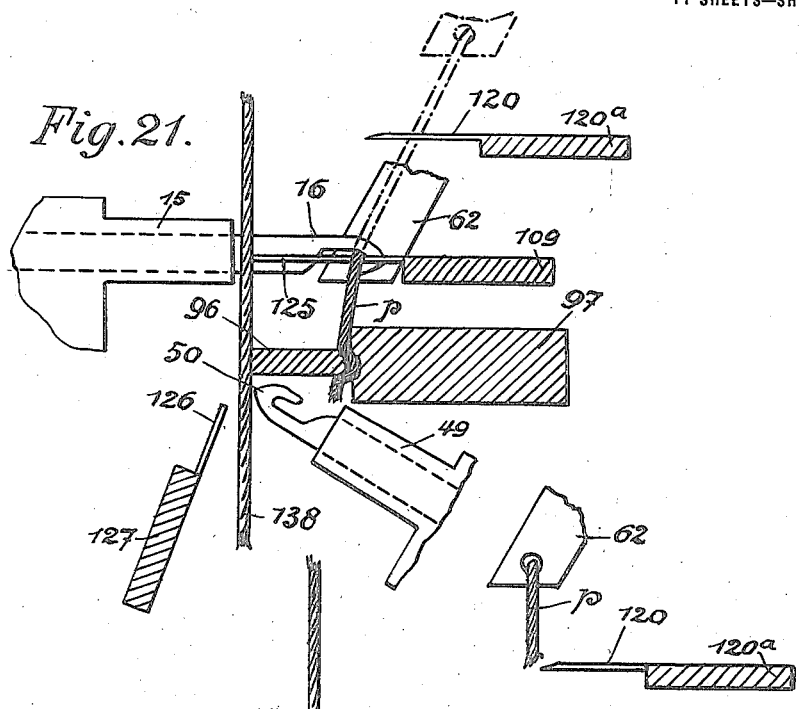

The operation of the hereinbefore described parts for forming the knots in pile-threads is as follows: In each thread-guide, as will be more clearly understood later on, an end of a pile thread $p$ projects downwardly, depending upon the position of the knotting tools, in Fig. 20, the thread-guides are moved into their lowest position by the swinging of the levers 55—56 and they thus present the ends of the pile-thread $p$ between the opened clamp 96—97; then the bar 96 is shut and clamps the threads. The clamping-devices on the thread-guides being released, the threads are then free to run through the same. The thread-guides are now swung radially upward above the thread-rests 125, whereupon these will advance into a position relative to the clamps as indicated in Fig. 21. The thread-guides now move laterally so that the threads $p$, which are still held fast by the clamps 96—97, are stretched at an angle over the thread rests. Then the clamping-strips 67, on the thread guides, clamp the threads and the arm 52 swings from the position shown in Fig. 2 into the position shown in Fig. 1, so as to bring the thread-guides 62 with the clamps 96—97 and the thread-rests 125 and knives 120 in the position shown in Fig. 21, in which these parts are in front of the warp 138. Likewise by means of the arm 13, and the lever 46—47, the hooks 15—16 and 49—50 are brought into the position shown in Fig. 20, as will be noticed on both sides of the warp 138, and the hooks 16, having now been moved out of their guides 15, will cross the warp with the hooks downward and be moved until they are above the pile thread stretched over the thread-rests 125. The clamping strips of the thread-guides are now released and the thread-guides are moved upwardly into the position shown in dotted lines in Fig. 21, whereupon the clamping strips are clamped again. The pile threads will now have assumed the position as shown in Fig. 27, and are clamped at their lower ends by the clamp and at their upper ends by the strips of the thread-guides. The knives 120 now advance and cut off all the pile threads (Fig. 2) but so that ends of sufficient length, for being caught again by the clamp, are left projecting, as shown in Fig. 22. The knives now return to their former position, whereupon the hooks 16 pull the cut-off pieces of thread from the thread-rests 125 to the left against the warp and the clamp 96—97 immediately opens. The hooks 16, continuing in this movement, pull the ends of the cut-off pieces of the pile thread along and across the warp. The warp 138 acts like a brake by its frictional contact on the pile threads and thereby prevents the said threads from slipping out of the hooks 16. As soon as the ends of the pile threads have passed the warp these ends are clutched fast between the hooks 16 and the guides 15 and are moved into the position of Figs. 22 and 28.

Figure 23:
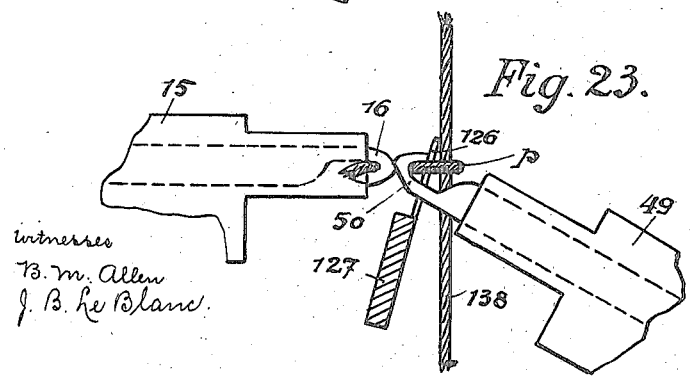

When the pile threads have been caught by the hooks 16 and pulled against the warp all parts of the arm 52 are free from further engagement and this arm will then return to the position shown in Fig. 2, whereupon the ends of the pile thread projecting below the thread-guides will be gripped again by the clamp 96—97 and the operation repeated so that those portions of pile thread above the thread-guides which have become loose will be utilized. Then by a downward movement of the hooks 15—16, which still grip the ends of the pile threads $p$ these threads are carried downward along the warp to a position opposite the hooks 50, as shown in Fig. 23. The hooks 50 are then in front of the warp and are so placed that when advancing each enters the space between the two warp threads that have been wound around by one pile thread. The hooks 50 now move out of their guides 49 at first only so far that their points enter between the warp threads in order to prevent their spreading. The holding-pins 126 now move up from the position shown in Fig. 22 to that shown in Fig. 23, whereupon the hooks 15—16 are moved so far horizontally sidewise in the direction of the arrow in Fig. 29 that the clutched ends of the pile thread are pulled laterally on one side of the two surrounded warp threads, as shown in Fig. 29. Then the hooks 50 are further advanced to the position Fig. 23, and reach a position entirely on one side of the two pile thread ends. The arm 13 then descends a little with all parts associated therewith, and also with the hooks 15—16, so that the ends of the pile thread which are not held by the holding pins 126 are caused to lie entirely within the hooks 50. The hooks 16 are now moved horizontally in the opposite direction to the position shown in Fig. 30, whereby the ends of the pile thread which were not held by the holding pins are made to press laterally against the hooks 50. The hooks 15, 16, then descend a little farther and still more laterally from the position shown in Fig. 30 into that shown in Fig. 31, whereby the ends of the thread not held by the holding pin are made to press against the underside of the hook 50 (Fig. 24). In this Fig. 24, however, the end of the next following thread on this side has been omitted to make the illustration clearer. In this position the holding pins 126 are withdrawn again by the arms 130 into their retracted position. The hooks 15, 16, now move farther sidewise and at the same time upwardly into the position shown in Fig. 32, whereby the ends of the thread which had been held by the holding pins slide into the hooks 50, while the other ends remain on the underside of the hooks. The thread has now been actually crossed above the hooks 50 as is represented in Fig. 25ª. The hooks 50 now advance a little farther (Fig. 25), and the hooks 15, 16, will at the same time move a trifle downwardly and the crossed threads caused to lie completely down into the hook 50. At this moment the hooks 15, 16, release the ends of the threads and the hooks 50 draw these ends downwardly through the warp and between the two warp threads along the other side of the warp where the two ends of each pile thread $p$ will be held and clamped fast by the hook 50 which has now been drawn into its guide 49.

In Fig. 26 $p'$ represents a tied knot while $p^2$ shows one being tied and Fig. 26ª is a diagrammatic illustration of the same.

It will also be noticed in this process that it is possible to employ open tools 49—50 for tying the knots, because the warp threads act by their frictional contact like brakes on the ends of the threads, preventing them from dropping and becoming lost.

The Smyrna knots are now made and only need to be drawn up and to be tightened, and this is done by a reed 143 (Figs. 1 and 19) as will be described hereinafter. The reed provided between the two frames 1 is held within two clamps 144 (Figs. 1 and 19) which are secured by nut bolts 145 at the lower ends of the arms 146 and participate in all their movements. These arms are fast to a shaft 147 held between two arms 148 which are mounted rigidly at each end of the machine on a shaft 149 journaled within the frames 1. On each side of the arms 146 vertical members 150 guide the same by means of friction rollers on pins 151. These guide members are secured to brackets 152 bolted to the beam 153 connecting the frames 1 and braces 154 stiffen these brackets. By the oscillations of the shaft 149, the arms 148 are swung, together with the arms 146 and the reed, the guide rollers traveling up and down in the guide members 150 in order to regulate the movement. Outside the frames 1 there are also arms 155 made fast on the shaft 149, while on another shaft 156 journaled at the bottom part of the frames, there are mounted the angular levers 157—158. The arms 157 of these levers are linked to the arms 155 by connecting rods 159. On the frames 1 there is also journaled a shaft 160 and a lever 161—162 is mounted thereon, one arm 161 is connected by means of a link 163 to a corresponding pin at the end of the arm 158 of the angular lever 157—158, while the other arm is engaged by means of a cam roller in the cam groove of a wheel keyed to the end of a shaft 4 projecting outside of one frame. This is the same shaft which drives the device for introducing the knots. To the pin to which the link 163 is connected there is also connected a link extending between the same and the shaft devices, so that the movements of the reed depend on the movements of the weft device. This device, however, forms no part of the present invention and therefore is not shown in the drawing. As soon as the hooks 50 have drawn the ends of the pile threads through the warp, as has been hereinbefore described, the main arms 13, with all their associated parts, swing from the position shown in Fig. 1 to that shown in Fig. 2, and will free the space for the reed. This reed descends and presses all the tied knots down unto the finished part of the carpet, while at the same time the hooks 49—50 pull the thread ends and thus the knots are made tight and brought to their proper places. The hooks 49—50 now release the thread ends and the whole process is ended. The main lever 46—47 also assumes the position shown in Fig. 2 and at the places where the knots have been tied, the weft is then inserted. It is to be understood that the knots may be tied either in rows entirely across the carpet at once, or in smaller groups or even one at a time.

The tying of a set of one or more knots is always performed in the time of one revolution of the shafts 2 or 4. Each revolution of said shafts repeats the whole knotting process and if the knots are tied in groups for each group one revolution of said shafts is required.

It will now be apparent that if several knots have to be tied at once, that the horizontal movements of the hooks 15—16 prevent any of the thread ends being presented to the wrong hooks 50. It will also be noticed that when the knots have to be tied in a mass only half of the tools used otherwise are necessary, because the hooks 15—16 always operate on two neighboring pile threads simultaneously.

I claim as my invention:

1. In a machine for manufacturing carpets a mechanism for tying knots in the pile threads consisting of a series of open hooks and guide bars therefor there being one hook for each pair of warps, located in front of the same, and a series of similar hooks and guide bars therefor located behind the warps, both series of hooks being adapted to work together to form clamps with their respective guide bars when crossing the pile threads and when tightening the newly formed knots, means for imparting a swinging movement to said hooks, and means coacting with the hooks behind the warps for drawing in and for crossing the ends of the pile threads.

2. In a machine for manufacturing carpets the combination with a frame, warp and carpet beams and means for moving the warps in a vertical position through a portion of the machine, of pile thread guides, means for gripping each pile thread, means for cutting the pile threads into predetermined lengths, means for forming the knots, comprising a series of open hooks and guide bars therefor there being one hook for a pair of warps, located in front of the same and a series of similar hooks and guide bars therefor located behind the warps, both series of hooks being adapted to work together and to form clamps with their respective guide bars when crossing the pile threads and when tightening the newly formed knots, means imparting to the hooks a swinging movement, and means coacting with the hooks behind the warps for drawing in and for crossing the ends of pile threads.

3. In a machine for manufacturing carpets, the combination with a frame, warp and carpet beams, and means for moving the warps in a vertical position through a portion of the machine, of pile thread guides, means for actuating the same, means for cutting the pile threads into predetermined lengths, means for gripping each pile thread, a series of down-turned hooks, means for actuating the same so that each pair of hooks passes between a pair of warps, engages the ends of the pile thread and draws the same between the said warps, a series of up-turned hooks, means for actuating the same so that each up-turned hook is caused to pass between a pair of warps to engage the ends of a pile thread and draw them back between the said warps to tie the pile thread about the pair of warps, and means for placing the pile threads in proper positions to be engaged by said hooks.

4. In a machine for manufacturing carpets, the combination with a frame, warp and carpet beams, and means for moving the warps in a vertical position through a portion of the machine, of pile thread guides, means for actuating the same, means for cutting the pile threads into predetermined lengths, means for gripping each pile thread, a series of down-turned hooks, guide bars for the same, means for actuating the said down-turned hooks and guide bars therefor independently of one another, so that the said hooks are moved out of the guide bars and passed between pairs of warps to engage the ends of a pile thread and draw the same between the said pairs of warps, the said hooks upon being so withdrawn clamping the ends of the pile threads between themselves and the guide-bars therefor, a series of up-turned hooks, guide bars therefor, and means for actuating the said upturned hooks and their guide bars so that each up-turned hook is passed between the members of a pair of warps to engage the ends of a pile thread, which, upon being released, are then withdrawn by the said up-turned hook between the pair of warps to tie the pile thread about the same.

5. In a machine for manufacturing carpets, the combination with a frame, warp and carpet beams, and means for moving the warps in a vertical position through a portion of the machine, of pile thread guides, means for actuating the same, means for gripping each pile thread, means for cutting the pile threads into predetermined lengths, a series of down-turned hooks, a guide bar for each of the same, means for actuating the said down-turned hooks to project the same from its guide bar between a pair of warps to engage the ends of a pile thread which upon being released is withdrawn and the ends thereof passed between pairs of warps and gripped between the said hook and its said guide bar with the loop in the pile thread surrounding the said warps, a series of up-turned hooks, a guide bar for each of the same, means for actuating each up-turned hook to cause the same to pass between a pair of warps, means then operative for moving the said down-turned hook and the guide bar associated therewith first in one direction and then in the other to first lay one end of the pile thread into the upturned hook and then the other end of the pile thread in the up-turned hook, thereby crossing the ends of the pile thread as the same are threaded in the up-turned hook, and means for withdrawing the said up-turned hook into its guide bar and thereby pulling the crossed ends of the pile thread between the warps to tie the pile thread about the same.

6. In a machine for manufacturing carpets, the combination with a frame, warp and carpet beams, and means for moving the warps in a vertical position through a portion of the machine, of pile thread guides, means for actuating the same, means for gripping each pile thread, means for cutting the pile threads into predetermined lengths, a series of down-turned hooks, a guide bar for each of the same, means for actuating the said down-turned hooks to project the same from its guide bar between a pair of warps to engage the ends of a pile thread which upon being released is withdrawn and the ends thereof passed between the pair of warps and gripped between the said hook and its said guide bar with a loop in the pile thread surrounding the said warps, a series of up-turned hooks, a guide bar for each of the same, means for actuating each up-turned hook to cause the same to pass between a pair of warps, means then operative for moving the said down-turned hook and the guide bar associated therewith first in one direction and then in the other to first lay one end of the pile thread into the up-turned hook and then the other end of the pile thread in the up-turned hook, thereby crossing the ends of the pile thread as the same are threaded in the up-turned hook, means for withdrawing the said up-turned hook into the guide bar and thereby pulling the crossed ends of the pile thread between the warps to tie the pile thread about the same, a series of holding pins, and means for actuating the same to cause each holding pin to maintain a pile thread in position about its pair of warps, while the ends of the pile thread are being drawn from between said pair of warps.

7. In a machine for manufacturing carpets the combination with a frame, of means for forming knots in pile threads, comprising a series of open hooks and guide bars therefor there being one hook for each pair of warps located behind the same, and a series of similar hooks and guide bars located in front of the warps, straight bars each notched on three sides to carry respectively the guide bars and hooks behind the warps and the guide bars and hooks in front of the same, in such a way, that any hook with its guide bar may be easily removed and replaced, and eccentric levers pivoted on each guide bar to lock the same to its straight bar.

8. In a machine for manufacturing carpets and in combination, series of open hooks, guide bars therefor, means for operating said guide bars and hooks, a series of similar hooks and guide bars therefor on the other side of the warps, means for moving the last aforesaid series of hooks to and from the said warps, means for imparting a vertical reciprocating movement to the last aforesaid series of hooks, and means for also imparting a sidewise shifting movement to the last aforesaid series of hooks, all the said movements of the last aforesaid series of hooks being imparted thereto when tying the knots in the pile threads.

9. In a machine for manufacturing carpets and in combination, a series of open hooks, guide bars therefor, means for operating the said hooks on one side of the warps, a series of similar hooks and guide bars therefor located on the other side of the warps, a straight bar to which the last aforesaid series of hooks is secured, a shaft, a gear wheel on said shaft provided with cam grooves in the sides thereof, arms journaled at one end on said shaft, guide rollers at the other end of said arms for said straight bar, a second shaft journaled in said arms, a segment connected to said second shaft, second arms journaled on said second shaft, a cross piece connected with said straight bar, collars on the said second shaft between which there is a bushing engaged by said cross piece, a third shaft journaled in one of said second arms, and to which said cross piece is secured, a worm on said third shaft, a nut actuated by the said worm, a fourth shaft, an arm mounted thereon, a segment secured to said fourth shaft and adapted to engage the aforesaid segment, the last aforesaid arm being provided with a roller adapted to engage in a groove of the first aforesaid gear wheel, a crank secured to said nut, a lever journaled on said fourth shaft and fitted with a roller engaging a cam groove of said gear wheel, and a link connecting said crank and the other end of said lever.

10. In a machine for manufacturing carpets in which the warps are moved vertically and in combination, a device for tying the knots in the pile threads, a bar, holding pins fitted in flanges and grooves in said bar, arms by which the said bar is carried, a shaft upon which the said arms are secured, and means for actuating the said shaft to move said holding pins in order to keep the pile threads in their proper positions while the ends of the same are crossed by knotting devices in tying the knots in the pile threads.

11. In a machine for manufacturing carpets in which the warps are moved vertically and in combination, a device for tying the knots in the pile threads, a bar, holding pins fitted in flanges and grooves in said bar, arms by which the said bar is carried, a shaft upon which the said arms are secured, second arms secured on said shaft, a drive wheel having cam grooves therein, angular levers the corresponding ends of which are provided with rollers engaging the said cam grooves, and links connecting the other corresponding ends of the angular levers and the said second arm to actuate the said shaft, thereby so moving the holding pins as to keep the pile threads in their proper positions while the ends of the same are crossed in tying the knots by the said tying mechanism.

12. In a machine for manufacturing carpets and in combination, devices for tying knots in pile threads about the warp threads, a bar, pile thread rests secured to said bar, a knife bar, knives fixed to said knife bar, rods by which the thread rest bar is carried, rods by which the knife bar is carried, vertically moving slide plates, connections between the same and the said rods, and means for actuating the vertically moving slide plates to cause the same to move the rods and thereby actuate the said thread rests and knives.

13. In a machine for manufacturing carpets and in combination, devices for tying knots in pile threads about the warp threads, a bar, pile thread rests secured to said bar, a knife bar, knives fixed to said knife bar, rods by which the thread rest bar is carried, rods by which the knife bar is carried, vertically moving slide plates, connections between the same and the said rods, a shaft, a drive wheel mounted thereon provided with cam grooves in its sides, a second shaft, arms mounted on the second shaft and provided at one end with rollers engaging the cam grooves in the said drive wheel, and connections between the opposite ends of said arms and said vertical moving slide plates whereby the same are actuated to move the rods and said thread rests and knives.

14. In a machine for manufacturing carpets and in combination, a shaft, main support levers journaled thereon, a second shaft journaled in said main support levers, angular levers journaled on said second shaft, a notched straight bar carried at the ends of corresponding arms of said angular levers, pile thread guides fitting the notched portions of said bar, there being a pile thread guide for each pair of warps, a third shaft mounted in said angular levers and adapted to engage recesses in said pile thread guides, and means for imparting reciprocating up and down motion to said pile thread guides by actuating said angular levers.

15. In a machine for manufacturing carpets and in combination, a shaft, main support levers journaled thereon, a second shaft journaled in said main support levers, angular levers journaled on said second shaft, a notched straight bar carried at the ends of corresponding arms of said angular levers, pile thread guides fitting the notched portions of said bar, there being a pile thread guide for each pair of warps, a third shaft mounted in said angular lever and adapted to engage recesses in said pile thread guides, and means for imparting a lateral movement to said pile thread guides.

16. In a machine for manufacturing carpets and in combination, a shaft, main support levers journaled thereon, a second shaft journaled in said main support levers, angular levers journaled on said second shaft, a notched straight bar carried at the ends of corresponding arms of said angular levers, pile thread guides fitting the notched portions of said bar, there being a pile thread guide for each pair of warps, a third shaft mounted in said angular lever and adapted to engage recesses in said pile thread guides, a straight plate notched at one edge and carried by said angular levers, a spring associated with each of said pile thread guides and adapted to be engaged by a notched portion of the straight plate, means for imparting a reciprocating up and down movement to the said pile thread guides, and means for imparting lateral movement to the said pile thread guides.

In testimony whereof I have affixed my signature in presence of two witnesses.

FERNAND BOYER.

Witnesses:
HANSON C. COXE,
ACHILLE MENU.